June 23, 1953  E. SIMON ET AL  2,642,920
HOUSING FOR ELECTRICAL APPARATUS
Filed Oct. 4, 1950  3 Sheets-Sheet 1
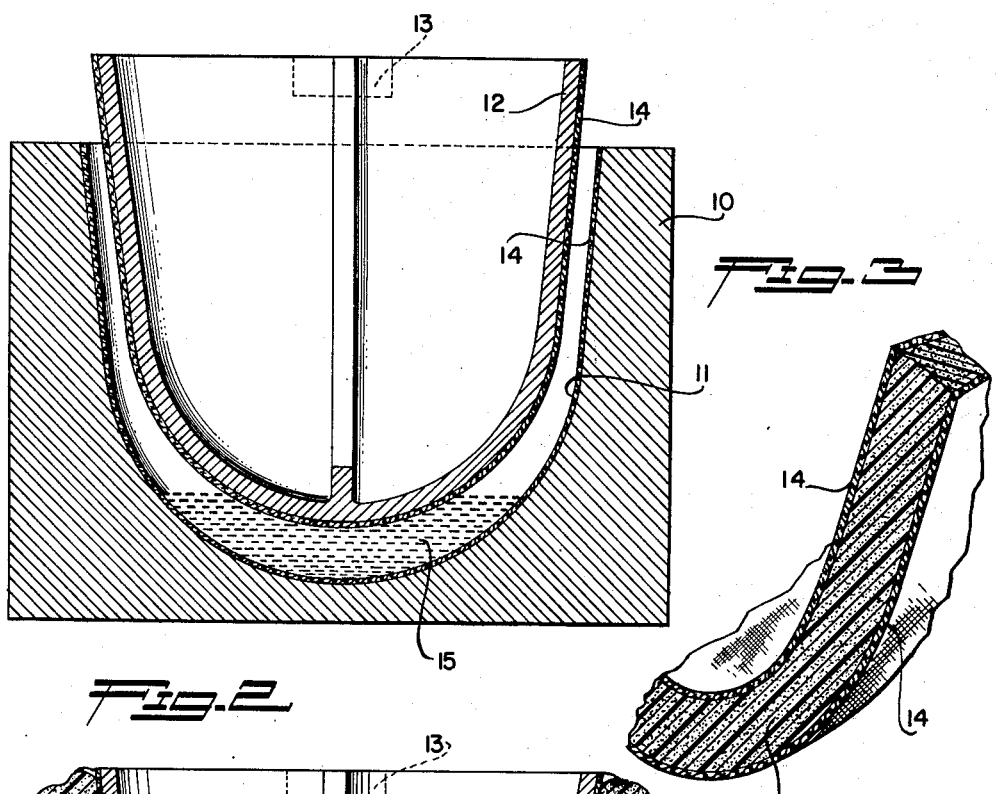
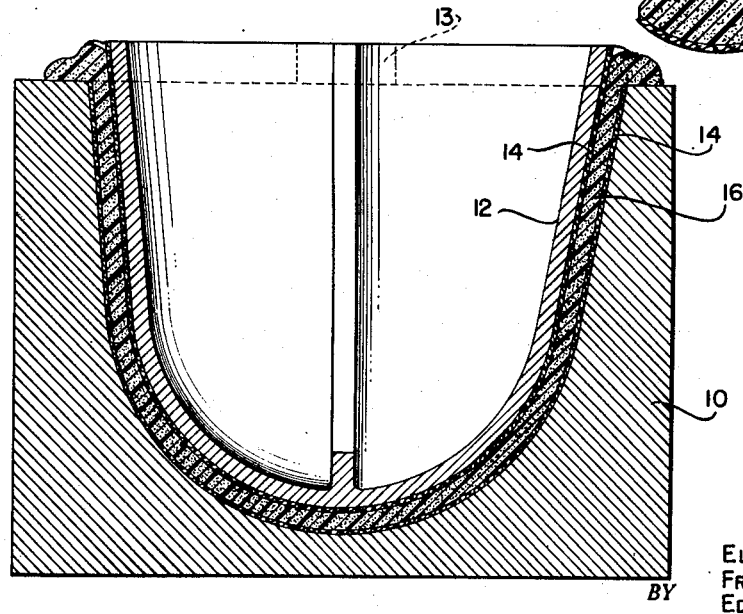
INVENTORS
ELI SIMON
FRANK W. THOMAS
EDWARD H. BURKART
BY
Agent June 23, 1953  E. SIMON ET AL  2,642,920
HOUSING FOR ELECTRICAL APPARATUS
Filed Oct. 4, 1950  3 Sheets-Sheet 2
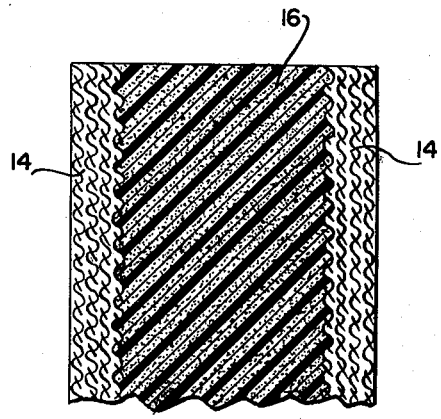
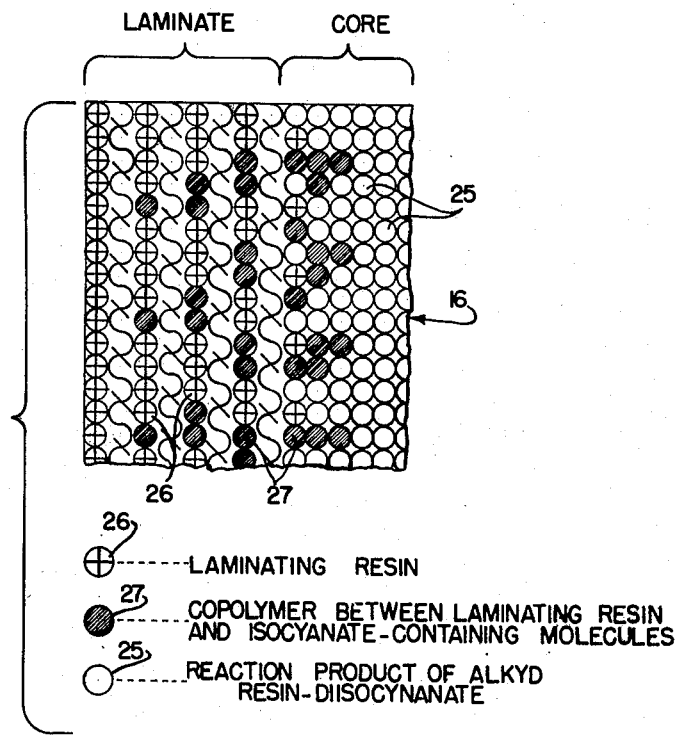
INVENTORS
ELI SIMON
FRANK W. THOMAS
EDWARD H. BURKART
BY
Agent June 23, 1953

E. SIMON ET AL 2,642,920

HOUSING FOR ELECTRICAL APPARATUS

Filed Oct. 4, 1950

INVENTORS
ELI SIMON
FRANK W. THOMAS
EDWARD H. BURKART

BY

George C. Sullivan

Agent

Patented June 23, 1953

2,642,920

UNITED STATES PATENT OFFICE 2,642,920

HOUSING FOR ELECTRICAL APPARATUS

Eli Simon, Los Angeles, Frank W. Thomas, Burbank, and Edward H. Burkart, North Hollywood, Calif., assignors to Lockheed Aircraft Corporation, Burbank, Calif.

Application October 4, 1950, Serial No. 188,384

12 Claims. (Cl. 154—2.6)

This invention relates to enclosures, housings, panels, etc. for electrical apparatus. The present application is a continuation-in-part of our copending application, Serial No. 76,952 filed February 17, 1949.

The products or devices of the invention have many applications, being useful in protecting, housing and supporting numerous classes of objects and instrumentalities, particularly where there is a need for dielectric properties coupled with high-strength and low-weight characteristics. While we do not intend to imply any restrictions on the applications of the products or articles, the invention is particularly well suited for incorporation or embodiment in radomes or housings for radar equipment, the housings constructed in accordance with the invention possessing excellent dielectric, strength, and vibration resisting characteristics, and being highly transparent or conductive of the microwaves of radar transmission. In certain of the prior methods of constructing such devices a core of previously produced honeycomb or foamed material was cut and shaped as required and then laminated between plastic-impregnated preformed and pre-cured laminated skins of fibre-glass fabric or the like, employing suitable laminating resins and jigs in the process. Such operations were time consuming and, therefore, costly and were not productive of uniform results. Furthermore, the micro-wave energy transmission characteristics of the prior products were relatively low and were not uniform due to the fact that the skin material and core material were joined at the interfaces by excessively thick and non-uniform layers of adhesive materials.

It is, accordingly, an object of the present invention to provide laminated objects and devices incorporating one or more skins and a low-density core and having superior strength characteristics and micro-wave transmission characteristics superior to those of the honeycomb type housings, etc.

Another object of the invention is to provide an article or device of the general character referred to having a core layer or lamination integrally and intimately joined or bonded directly with the skin laminations. The core is reacted and cast directly between the skin laminations at the time the housing or device is constructed so as to adhere directly to the skin laminations to obtain a stronger product having more uniform micro-wave transmission characteristics, etc.

Another object of the invention is to provide articles of the general class referred to in which the materials of the cellular core and the laminating resin of the skins are chemically united to obtain the greatest possible strength. In the structures of the invention where the cellular core material is reacted between the laminated skins impregnated with unpolymerized resin, the reactant mixture of the core material and the laminating resin of the skins intermingle and unite chemically in zones which may consist primarily of copolymers between the laminating resin and the resin-polyisocyanate mixture of the core with molecules of both the resin and the mixture interspersed therein. These interfacial zones of intermediate composition are coextensive with the marginal areas of the core and with at least certain of the laminations of the skin, thereby strengthening the structure by including in the skin laminae some of the resin-polyisocyanate foam with its inherent high strength characteristics. Thus the products of the invention are differentiated from the laminated structures of the prior art where the core material and the skin laminations were joined at the interfaces by adhesion of the core to the skin laminations by resins applied to or impregnated in the skin laminae and merely contacting the surfaces of the previously formed and machined core, leaving distinct interfacial planes or connections of low strength.

Another object of the invention is to provide a laminated structure of the character mentioned in which the internal core and the skin laminations, or lamination, are joined and bonded one with the other by both a chemical union of the laminating resins of the skin and the core and by mechanical interlocking of the core material and the material or fabric of the skins. In accordance with one embodiment of the invention the cloth or fabric of the skins is provided with a laminating resin in a manner to cover or coat the individual threads or fibres of the fabric and yet leave pores or openings between the same and the core material is reacted between the skins to enter and fill these pores to obtain the mechanical lock and to unite chemically with the laminating resin to obtain the chemical union, or to adhere to the individual resin coated threads of the cloth. The laminating resin applied to the skin fabric may be wet at the time the core material is poured to obtain a diffusion region in which there is copolymerization of the core and skin resins to effect the chemical union of the resins of the skins and core, or the skin resin may be set or hardened and cured so that there is adhesion of the core material with the resin impregnated fabric as well as the mechanical locking engagement of the core material in the pores of the fabric. If desired, the resin applied to the fabric may be allowed to set and cure and the skin may be preformed and then immediately prior to the pouring of the core material a second resin may be applied to the porous resin-coated skin to obtain a copolymerized diffusion zone and the penetration of the core material into the pores of the skin. In each of these modes of procedure the strength of the bond of the skin with the core approaches the strength of the core, the potential physical characteristics of the foamed core material being effectively utilized.

Other objectives and features of the invention will become apparent from the following detailed description of typical preferred embodiments in which reference will be made to the accompanying drawings where:

Figure 1 is a vertical sectional view illustrating skin laminations on the surfaces of male and female mold parts and showing the unreacted core material in the mold;

Figure 2 is a view similar to Figure 1 illustrating the core material in the foamed or cellular condition showing the manner in which the reactant core material holds the skin against the surfaces of the mold;

Figure 3 is an enlarged fragmentary perspective view of the structure or product made in accordance with the invention;

Figure 4 is an enlarged fragmentary sectional view illustrating the several laminations of the skins and the core of the product;

Figure 5 is a diagrammatic view on a greatly enlarged scale illustrating the skin and an interfacial region of the product showing the interspersion of the cellular core material and the laminating resin of the skin;

Figure 6:
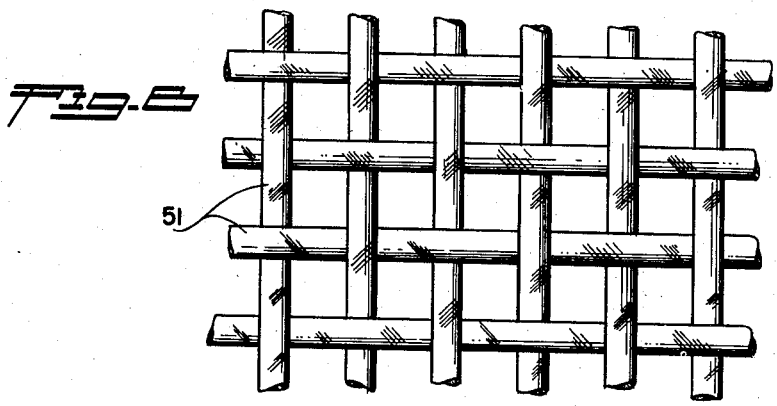
Figure 6 is a greatly enlarged fragmentary view of one of the untreated skin laminations or fabric layers.
Figure 7:
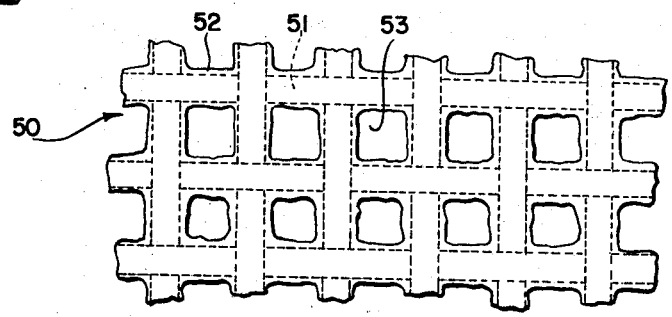
Figure 7 is a view similar to Figure 6 showing the laminating resin applied to the fabric.
Figure 8:
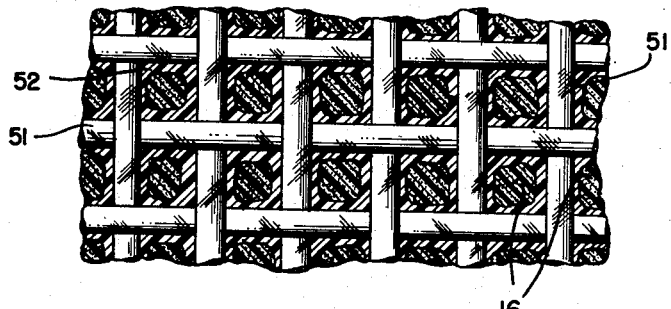
Figure 9:
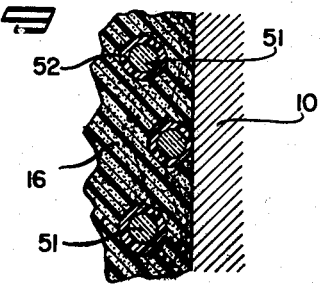

Figure 8 is a fragmentary sectional view with the fabric appearing in elevation and illustrating the material of the core occupying the pores in the resin coated or impregnated fabric of the skin; and Figure 9 is a fragmentary sectional view taken in a plane normal to the plane of sectioning of Figure 8 illustrating the mechanical lock or engagement of the core material with the resin impregnated skin fabric.

The products or devices of the invention may vary greatly in their intended use or application. For example, the devices may be panels, sheets, or covers, or may be housings, casings or containers of simple or complex shape for electrical devices and other mechanisms of different kinds. As above pointed out, the devices or structures of the invention transmit radar energy, etc. with a minimum of loss and we will herein describe the invention as embodied in shells, housings, or domes, for radar transmitting and/or receiving equipment, it being understood that this is only one typical application of the invention.

It is believed that the characteristics of the products of the invention will be best understood by describing the materials employed and the methods of producing the products. In one method or manner of making the articles the outer laminating material or skin material 14 is provided on the surfaces of a mold 10-12, a reactant alkyd resin-polyisocyanate mixture 15 is introduced into the skin-lined mold cavity and allowed to react to form a cellular core 16 between and bonded with the skin laminations 14 and the resultant laminated structure may then be post-cured at slightly elevated temperatures.

The mold incluudes a female part 10 having a central cavity 11 and a male part 12 conforming generally in shape with the cavity. The upper end of the cavity 11 remains open to the atmosphere at all times while it lower end is closed. The mold cavity 11 of course may be of any required or desired shape and in the particular case illustrated is spherically concave at its lower end. The male mold part 12 is shaped so that its external surface is substantially parallel with and equally spaced from the wall of the cavity 11 when the mold parts are in their final positions. The part 12 is adapted to extend upwardly beyond the upper surface of the part 10 and its projecting portion has spaced radially projecting lugs 13 which are adapted to rest on the part 10 to support the male part 12 and may, if desired, be constructed to obtain the desired spacing between the walls of the cavity 11 and the surface of the part 12.

The abovementioned outer or skin materials 14 are arranged to cover or line the surfaces of the mold. These materials 14 will, of course, vary in character, depending to a considerable extent upon the intended use of the product being manufactured. Where the product or housing is designed for the transmission of radar or microwave energy, the skin materials 14 may be fibreglass fabric, superimposed layers of non-impregnated fibre-glass cloth, felt, fibre-glass matting, or other materials that are substantially transparent to radar energy. While in most cases it is preferred to employ a plurality of superimposed layers of such material 14, on the surfaces of the cavity 11 and mold part 12, Figures 1 and 2 illustrate, for the sake of clarity, only one layer or thickness of the fabric 14 on each mold surface. In Figures 4 and 5, where the product is illustrated on a much larger scale, there are pluralities of the skin material layers 14 on each side of the housing or product.

The skin materials 14, whether employed as single layers or as a plurality of superimposed layers, are preferably arranged to completely cover the walls of the cavity 11 and the surface of the mold part 12, at least to the height where the housing is to be trimmed off or finished. The skin materials 14 may either be preformed and prelaminated, that is impregnated with a laminating resin and then formed and shaped to fit their respective mold surfaces, the resin being cured so that the skin materials are substantially rigid and self-supporting, or the skin materials 14 may be unlaminated and without resin, either cured or uncured, in which case appropriate care is taken to arrange and support the soft, unformed skin materials 14 on their respective mold surfaces. Where the skin materials 14 have a plurality of layers, it is preferred to offset the edges of the adjacent layers so that substantially uniform strength is obtained. Following the lining of the mold cavity with the material 14, a suitable quantity of a reactant cellular plastic producing material or mixture 15 is introduced into the cavity. Figure 1 illustrates a body of the liquid reactant mixture 15 in the lower portion of the cavity 11, the surfaces of the mold having been lined with the material 14, as above described. It is preferred to employ a reactant alkyd resin meta-toluene diisocyanate mixture of the class described and claimed in the copending application of Eli Simon and Frank W. Thomas, Serial No. 77,058, filed February 17, 1949.

The alkyd resins which we preferably employ in the polyisocyanate reactant mixtures are the reaction products of polyhydric alcohols and polybasic acids unmodified or modified with oil and/or other resins and having an acid number of from 5 to 80, a water content of from 0.1% to approximately 3.0% by weight and having the following ratio range of the hydroxyl to the carboxyl groups in the alkyd resin reactants:

from 3 hydroxyl (OH):1 carboxyl (COOH) to 4 hydroxyl (OH):5 carboxyl (COOH).

It is usually preferred to employ alkyd resins having an acid number of between 10 and 25 and wherein the ratio of the hydroxyl groups to the carboxyl groups is 2 to 1. The following formulae are suitable for preparing unmodified alkyd resins from polyhydric alcohols and polybasic acids, the ratios of the hydroxyl groups to the carboxyl groups in the alkyd resin reactants of these formulae being 2 to 1.

FORMULA A

| | Mols |
|---|---|
| Glycerol | 4 |
| Adipic acid | 2.5 |
| Phthalic anhydride | 0.5 |

FORMULA B

| | Mols |
|---|---|
| Glycerol | 2 |
| 1, 4 butylene glycol | 1 |
| Adipic acid | 2 |

FORMULA C

| | Mols |
|---|---|
| Trimethylol propane | 4 |
| Adipic acid | 2.5 |
| Phthalic anhydride | 0.5 |

In Formula A from 3 to 5 mols of glycerol, from 1.5 to 3 mols adipic acid and from 0.1 to 1.5 mols of phthalic anhydride may be used while in Formula C the practical operative range of proportions is from 3 to 5 mols trimethylol propane, from 1.5 to 3 mols adipic acid and from 0.1 to 1.5 mols of phthalic anhydride. The following Formulae D and E are suitable for preparing unmodified alkyd resins from single polyhydric alcohols and single polybasic acids productive of resins suitable for use in the cellular plastic mixture.

FORMULA D

| | Mols |
|---|---|
| Glycerol | 4 |
| Adipic acid | 3 |

FORMULA E

| | Mols |
|---|---|
| Trimethylol propane | 3 |
| Phthalic anhydride | 2 |

The ratio of the hydroxyl groups to the carboxyl groups in the alkyd resin reactants of Formula D is 2(OH):1(COOH) and in Formula E this ratio is 9(OH):4(COOH). The following Formula F is an example of an oil modified alkyd resin suitable for employment in the reactant cellular plastic producing mixture, the ratio of the hydroxyl groups to the carboxyl groups in the alkyd resin reactant being 3(OH):3½(COOH).

FORMULA F

| | Mols |
|---|---|
| Glycerol | 1 |
| Phthalic anhydride | 1.5 |
| Oleic acid | 0.5 |

The following Formula G is an example of a natural resin modified alkyd resin suitable for incorporation in the cellular foamed plastic core material, the ratio of the hydroxyl to the carboxyl groups being 1 to 1.

FORMULA G

| | | |
|---|---|---|
| Glycerol | gram mol | 1 |
| Sebacic acid | do | 1½ |
| Resin copal | grams | 100 |

We have found that the most satisfactory results are obtained when the water content range of the alkyd resin component of the diisocyanate alkyd resin reactant mixture is from 0.1% to 3.0% by weight without regard to the specific manner of incorporating the water in the mixture. In the typical examples herein set forth, it will be considered that the water component of the diisocyanate-alkyd resin reactant mixture is incorporated by dissolving a calculated amount of the water in the selected alkyd resin and suitably agitating the resin-water mixture so that the alkyd resin component will contain the selected proportion of water. However, as set forth in the copending application of Eli Simon and Frank W. Thomas, Serial No. 35,294, filed June 25, 1948, the water may be incorporated in the reactant mixture in combination with a non-ionic wetting agent or by the use of one or more salt hydrates.

The isocyanate employed in the alkyd resin polyisocyanate reactant mixture is preferably meta-toluene diisocyanate. As described and claimed in the copending application of Eli Simon and Frank W. Thomas, Serial No. 50,007, filed September 18, 1948, metallic soap powders may be incorporated in the diisocyanate alkyd resin reactant mixture to serve as foaming agent stabilizers and thus obtain superior results. The metallic soap powders that are effective for this purpose are metallic soap powders of fatty acids having from 12 to 20 carbon atoms including:

Zinc stearate
Aluminum stearate
Calcium stearate
Magnesium stearate
Magnesium hydroxy stearate
Barium stearate
Zinc laurate
Calcium oleate
Strontium stearate.

The proportion of the metallic soap powder employed may vary considerably. Thus, it has been found that from 1/8 gram to 7½ grams of the selected metallic soap powder may be used for each 30 grams of the alkyd resin in the alkyd resin-meta-toluene diisocyanate reactant mixture.

The copending application of Eli Simon and Frank W. Thomas, Serial No. 77,058, filed February 17, 1949, discloses the incorporation in the alkyd resin-meta-toluene diisocyanate-water system of high molecular weight thermoplastic film producing polymeric resin additives which serve as film stabilizers. These additives result in the production of foamed plastics having very small uniform cells and having superior physical strength. Furthermore, the additives permit the use of a high water content in the alkyd resin-meta-toluene diisocyanate system, for example a water content of 5% by weight, thus reducing the density of the cellular plastic material. Further, it has been found to be particularly advantageous to employ the high molecular weight polymeric additives in the cellular plastic material of the cores where the product or articles of this invention are to be used in association with radar equipment.

The high molecular weight polymeric resin additives are soluble in the meta-toluene diisocyanate and may or may not react therewith. Included among these additives that are productive of a more effective small cell foamed plastic core material are:

1. Ethyl cellulose: This polymeric resin has a molecular weight of approximately 130,000 and it is preferred to employ an ethyl cellulose having from 45.0 to 49.5% ethoxyl content. The best results have been obtained where the viscosity is between 50 and 100 centipoises although the viscosity may range between 7 and 200 centipoises.
2. Polymeric chlorinated natural rubber: This product has an average chlorine content of 67% and a preferred viscosity of between 125 and 1,000 centipoises.
3. Polymeric acrylate and methacrylate resins and their copolymers (prepared by polymerizing lower esters of acrylic and methacrylic acid):

a. Methyl methacrylate
   b. Propyl methacrylate
   c. Isobutyl methacrylate
   d. Butyl methacrylate
   e. Co-polymer of methyl acrylate and ethyl methacrylate.

4. Benzyl cellulose—formed by the reaction of benzyl chloride with alkali cellulose.
5. Polystyrene.
6. Polydichlorostyrene.
7. Natural rubber (polymeric isoprene) the molecular weight of natural rubber has been variously determined as ranging between 100,000 and 300,000.
8. Polyvinyl butyral.
9. Polymeric vinyl chloride-vinyl acetate co-polymers, a. Containing approximately 87% vinyl chloride and 13% vinyl acetate and having a molecular weight of approximately 6,000 to approximately 25,000.
   b. Containing from 90% to 95% vinyl chloride.

10. Polyvinyl acetate (produced by polymerization of vinyl acetate). The molecular weights of the polyvinyl acetate suitable for incorporation in the cellular plastic formulation range from approximately 10,000 to approximately 50,000.
11. Polyvinyl chloride (having an average molecular weight of approximately 5,000).

The concentration or proportion of the selected high molecular weight polymeric resin employed may be varied considerably. For example, from 0.03 gram to 15 grams of the ethyl cellulose or from 5 to 20 grams of the chlorinated natural rubber may be used with each 100 grams of the meta-toluene diisocyanate as incorporated in the reactant cellular foamed producing mixture.

The cellular plastic core material employed in the core 16 of the product of the invention may be made flame resistant and self-extinguishing when once ignited by incorporating flame retardant additives in the alkyd resin-meta-toluene diisocyanate reactant mixture. Such additives are unsaturated alkyl esters of aryl phosphonic acids, namely compounds having the general formula:

$$ArPO(OCH_2CR:CHR^1)_2$$

where Ar represents aryl and alkaryl hydrocarbon radicals and R and $R^1$ are hydrogen and alkyl hydrocarbon radicals. Compounds of this character are described in United States Letters Patent No. 2,425,765 issued August 19, 1947, and include:

1. Diallyl phenyl phosphonate
2. Bis(methallyl) benzene phosphonate
3. Diallyl toluene phosphonate.

These additives, in addition to imparting flame resistance and to decreasing flame propagation characteristics of the foamed cellular product, also serve to materially decrease the density of the foamed material. In practice, from 1 gram to 20 grams of the flame resistant additive may be employed with each 30 grams of the alkyd resin. Where such fire resistant additives are employed, it may be found desirable to predissolve benzoyl peroxide in the additive in the proportion of approximately 5% by weight of the additive.

The following are typical examples of the alkyd resin-metatoluene diisocyanate reactant formulations for the core forming mixture 15:

*Example I*

| | Grams |
|---|---|
| Alkyd resin of Formula C having an acid number of 20 and a water content of 0.85% by weight | 60 |
| Meta-toluene diisocyanate containing 2 grams of ethyl cellulose, having a centipoise viscosity of 7 and an ethoxyl content of from 46.8 to 48.5 per 100 grams of the metal-toluene diisocyanate | 40 |
| Diallyl phenyl phosphonate | 10 |
| Benzoyl peroxide | 0.5 |

*Example II*

| | Grams |
|---|---|
| Alkyd resin of Formula C having an acid number of 20 and a water content of 0.85% by weight | 60 |
| Meta-toluene diisocyanate containing 1 gram of ethyl cellulose, having a centipoise viscosity of 200 and an ethoxyl content of from 46.8 to 48.5 per 100 grams of the meta-toluene diisocyanate | 40 |
| Diallyl phenyl phosphonate | 10 |
| Benzoyl peroxide | 0.5 |

*Example III*

| | Grams |
|---|---|
| Alkyd resin of Formula C having an acid number of 20 and a water content of 0.85% by weight | 60 |
| Meta-toluene diisocyanate containing 0.03 gram ethyl cellulose of 100 centipoise viscosity and from 48.0 to 49.5% ethoxyl content per 100 grams of meta-toluene diisocyanate | 40 |
| Diallyl phenyl phosphonate | 10 |
| Benzoyl peroxide | 0.5 |

Example IV

| | Grams |
|---|---|
| Alkyd resin of Formula C having an acid number of 20 and a water content of 0.85% by weight | 60 |
| Meta-toluene diisocyanate containing 2 grams of ethyl cellulose of 100 centipoises viscosity and an ethoxyl content of from 48.0 to 49.5% per 100 grams of meta-toluene diisocyanate | 40 |
| Diallyl phenyl phosphonate | 10 |
| Benzoyl peroxide | 5 |

Example V

| | Grams |
|---|---|
| Alkyd resin of Formula A having an acid number of 16 and a water content of 0.87% by weight | 30 |
| Meta-toluene diisocyanate | 20 |
| Zinc stearate powder | 2 |
| Diallyl phenyl phosphonate | 5 |
| Benzoyl peroxide | 0.25 |

Example VI

| | Grams |
|---|---|
| Alkyd resin of Formula C having an acid number of 20 and a water content of 0.85% by weight | 30 |
| Meta-toluene diisocyanate containing 5 grams of chlorinated natural rubber of 1,000 centipoises viscosity per 100 grams of meta-toluene diisocyanate | 20 |
| Diallyl phenyl phosphonate | 5 |
| Benzoyl peroxide | 0.25 |

Example VII

| | Grams |
|---|---|
| Alkyd resin of Formula C having an acid number of 20 and a water content of 0.85% by weight | 30 |
| Meta-toluene diisocyanate containing 4 grams of benzyl cellulose per 100 grams of the meta-toluene diisocyanate | 20 |
| Diallyl phenyl phosphonate | 5 |
| Benzoyl peroxide | 0.25 |

Example VIII

| | Grams |
|---|---|
| Alkyd resin of Formula A having an acid number of 20 and a water content of 0.56% by weight | 30 |
| Meta-toluene diisocyanate | 20 |
| Zinc stearate powder | 0.25 |
| Aluminum leafing powder | 1.5 |

Example IX

| | Grams |
|---|---|
| Alkyd resin of Formula A having an acid number of 14 and a water content of 0.31% by weight | 30 |
| Meta-toluene diisocyanate | 20 |
| Aluminum stearate powder | 1 |

Example X

| | Grams |
|---|---|
| Alkyd resin of Formula A having an acid number of 34 and a water content of 1.4% by weight | 30 |
| Meta-toluene diisocyanate | 22½ |
| Aluminum leafing powder | 1½ |

When the article being produced is required to transmit radar energy it is not desirable or practical to incorporate metallic leafing powders in the formulations.

The abovementioned laminating resins applied to or impregnated in the skin materials 14 may be thermosetting plastic resins or blends or mixtures of thermosetting resins and thermoplastic resins. The laminating resins of the skin materials 14 are capable of copolymerizing with the foaming alkyd resin-diisocyanate reaction products to result in diffusion zones of cured or hardened resins, which zones are characterized by a gradual gradation in content from substantially pure laminating resin in the outer portions or laminae of the skins 14, to intermediate areas at the interfaces of the core 16 and skins 14 containing laminating resin molecules, alkyd resin-diisocyanate reaction product molecules and molecules of the co-polymer between the laminating resin and the reaction product and thence to the substantially pure alkyd resin-diisocyanate reaction products of the core 16. The nature of these diffusion zones, as we believe them to be constituted is illustrated in Figure 5 which diagrammatically represents on a large scale a small area of a skin 14 and adjacent portion of the core 16 in cross section. In Figure 5, as indicated by the legends, the material of the core 16, that is the reaction products of alkyd resin-diisocyanate mixture are represented by the circles 25, the laminating resin molecules are represented by the circles 26 enclosing the crosses, while the co-polymer between the laminating resin and the isocyanate containing molecules are represented by the circles 27 enclosing the diagonal lines. It will be seen from an inspection of Figure 5 that the interfacial area, where the mass of the core 16 joins the innermost skin layer 14, has substantially equal numbers of the three above named molecules 25, 26 and 27, while there is little or no penetration of the substantially pure core material molecules 25 into the skin 14 there are a considerable number of the co-polymer molecules 27 between the innermost skin layer 14 and the adjacent lamination 14. The number of these molecules of the co-polymer gradually lessen in the succeeding laminations 14 until there may be none in the outermost skin lamination. The diffusion areas or zones of graduated or merging physical composition and physical characteristics assure great strength in the laminated or sandwich-type product resulting in a product much superior to the typical laminated structures where there are distinct planes or limited sectional areas of abrupt change from one material to the other.

The laminating resins capable of copolymerizing with the reaction products of the alkyd resin and diisocyanate of the core 16 may be selected from substantially different classes of resins or compounds including:

(a) Unsaturated polyesters containing more than one vinyl group per molecule so as to be capable of cross linking and forming insoluble thermosetting type resins. Included in this classification are the reaction products of maleic anhydride with a glycol such as di-ethylene glycol which, after the initial reaction are further heated, and condensed to yield the linear polyester:

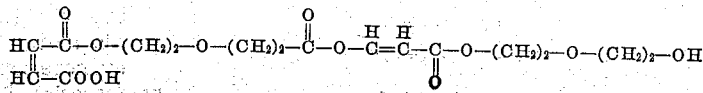

(b) Unsaturated alkyl esters of aryl phosphonic acids such as disclosed in United States Letters Patent Number 2,425,765 issued August 19, 1947. Included in this group are the following:
(1) Diallyl phenyl phosphonate

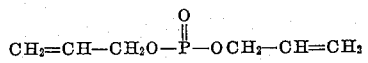

(2) Bis(methallyl) benzene phosphonate

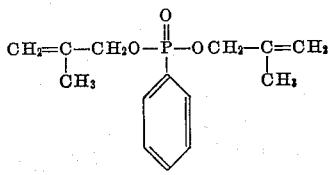

(3) Diallyl toluene phosphonate

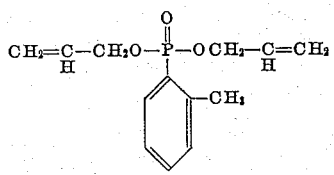

(c) Unsaturated alkyl esters of alkenyl phosphonic acids of the general class disclosed in United States Letters Patent No. 2,425,766 issued August 19, 1947:
(1) Diallyl isobutene phosphonate

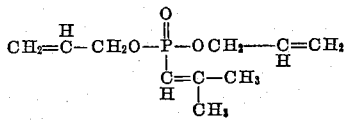

(2) Diallyl styrene phosphonate

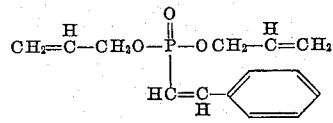

(3 Bis(methallyl) styrene phosphonate

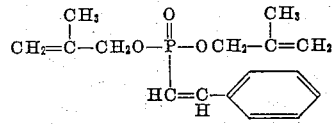

(d) Diallyl phthalate

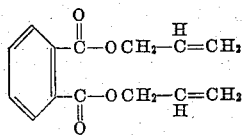

(e) Allyl, methallyl or crotyl glycol carbonates, such as bis(allyl) diethylene glycol carbonate:

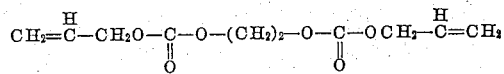

(f) Glycol diacrylate

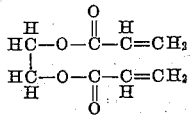

If desired, the laminating resin may comprise a blend or mixture of a selected unsaturated polyester, such as above named, and a monomeric compound which serves as a copolymerizing additive. For example, the unsaturated polyester between diethylene glycol and maleic anhydride with the polymerization carried to and acid number of from 10 to 40 may be mixed with any of the following thermoplastic monomeric vinyl compounds, each having one vinyl group per molecule to constitute the laminating resin.

(a) Styrene (vinyl benzene)

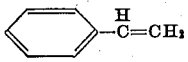

(b) Dichloro styrene

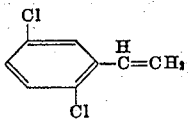

(c) Acrylonitrile (vinyl cyanide)

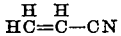

(d) Vinyl acetate

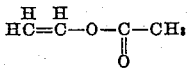

(e) Vinylidene chloride

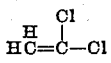

(f) Vinyl chloride

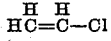

(g) Diphenyl ethylene

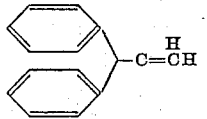

(h) Methyl vinyl ketone

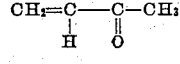

(i) Methyl methacrylate

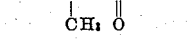

(j) Vinyl esters, such as ethyl vinyl ether

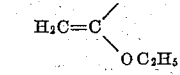

Where the laminating resin for the skin material 14 is a mixture of the unsaturated polyester and the monomeric mono-vinyl compound, there may be from 10 to 100 parts by weight of the monomeric compound for each 100 parts by weight of the unsaturated polyester resin.

The present invention, being directed to the laminated products, is not directly concerned with the theory of the chemical action or mechanism attending the copolymerizing of the isocyanate containing molecules of the foaming core material 15 with the laminating resin. However, it appears that there are two ways in which this copolymerization takes place:

(1) By the reaction of the isocyanate containing molecules of the material comprising the core 16 with the hydroxyl (OH) and/or with the carboxyl (COOH) groups of the laminating resin. Thus:

(a)

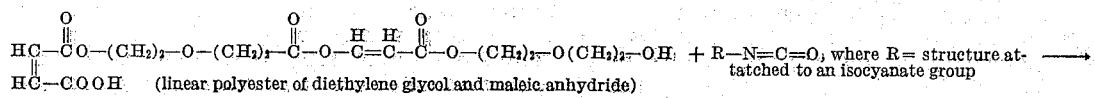

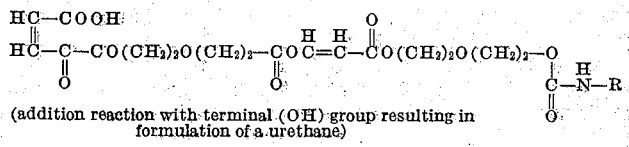

(addition reaction with terminal (OH) group resulting in formulation of a urethane)

(b)

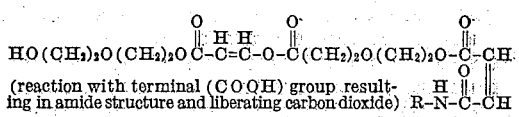

(2) By the addition copolymerization of the activated isocyanate groups of the core material 15 with the activated vinyl groups of the laminating resin. Thus:

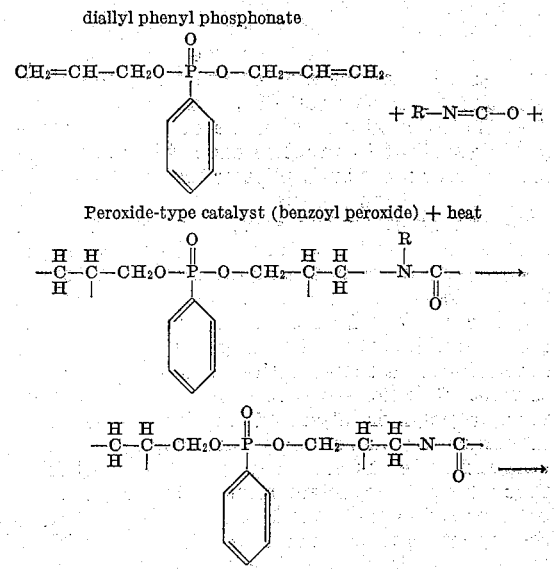

It is to be understood that when the laminating resin on, or incorporated in, the skin material 14 is unpolymerized and in a liquid or semi-liquid state when the reactant core producing material or mixture 15 is introduced into the mold cavity and allowed to react. The reaction of the material 15 is accompanied by the development of gas pressure which urges the skin materials 14 outwardly into conforming engagement with the walls of the mold and which brings the reactant foaming isocyanate containing mixture 15 into direct and intimate contact with the laminating resin so as to admix therewith. This admixing of the foaming isocyanate containing mixture 15 with the laminating resin is important in that it not only brings about the above described copolymerization of the two materials but also because it reduces the friction between the rising foaming mixture 15 and the skins 14. When the foaming core material 15 rises along the surface of a dry pre-cured laminated skin the marginal cells of the core 16 are found to be elongated in the vertical direction due to the friction or resistance to vertical motion offered by the pre-cured skin. The resultant elongated cells of the core 16 are somewhat weaker than the uniform and substantially spherical cells of the internal areas of the core 16, leaving a weak interfacial zone. However, when the skin laminating resin is uncured at the time the core material 15 is reacted in the mold, this elongation of the outermost cells of the core 16 is eliminated or at least reduced and because the above described interfacial zone contains the copolymer of the core material and the laminating resin, the interfacial zone is materially strengthened instead of being weakened.

Following the introduction of the reactant plastic material 15 into the lined female mold 10, the male mold part 12, carrying its skin material 14, is entered into the cavity 11 and properly positioned with respect to the mold part 10. Figure 1 shows the mold part 12 being entered into the cavity 11. It will be observed that the introduction of the part 12 into the cavity 11 partially displaces the reactant alkyd resin-polyisocyanate 15 upwardly in the mold and that the upper end of the mold cavity 11 remains open to the atmosphere. The alkyd resin-polyisocyanate mixture reacts at atmospheric pressure to produce a multitude of small uniform spherically shaped gas filled cells throughout the entire core 16 and the foaming plastic mass rises in the mold space to spill over the top of the mold assembly in the manner illustrated in Figure 2. While not essential, it is preferred to maintain the mold parts at a temperature of about 120° F. during the reaction of the core forming cellular plastic material 15. The foam producing reaction of the material 15 is accompanied by exothermic heat and pressure, the heat assisting in curing the resin and the pressure serving to urge the skins 14 firmly and evenly against the walls of the mold. Where the skin material 14 has been prelaminated and preformed, the cellular plastic 16 adheres to and bonds with the inner surfaces of the laminated material 14. The resin employed in the prelaminated skin material 14 is preferably compatible with the alkyd resin-polyisocyanate mixture but in any event the latter securely bonds with and adheres to practically all skin materials and the laminating resins incorporated therein. When the skin materials 14 are prelaminated and preformed and contain polymerized cured resins or plastics, the material of the cellular plastic core 16 does not penetrate the skin materials 14 to any appreciable extent and will not engage or adhere to the walls of the cavity 11 or the surface of the mold part 12. The product or housing is then preferably post-cured in the mold at a temperature of from 125° F. to 225° F. for up to 24 hours to continue polymerization of the reaction and thus obtain a stronger, more heat stable core 16, whereupon the product is removed from the mold.

When the skin materials 14 are not prelaminated and not preformed but are in the nature of one or more layers of dry, porous or soft fabric, felt, or the like, the reactant alkyd resin-polyisocyanate mixture 15 penetrates the skin materials 14 as it reacts and rises in the mold assembly and, therefore, will reach the wall of the cavity 11 and the surface of the mold part 12. Accordingly, it is desirable in this case to coat or cover the surfaces of the mold parts with a parting material prior to arranging or positioning the skin materials 14 in the mold so that the alkyd resin-polyisocyanate mixture will not adhere to the mold wall. Graphite, deposited from oil-dag, water-dag, or alcohol-dag, a silicone oil, or mineral oil, or the like, may be used as the parting material. When the article being produced is to be used with radar equipment it is preferred to employ a silicone oil or mineral oil, or the equivalent, as a parting material. In such cases, if desired, a preformed flexible strippable bag of plasticized polyvinyl alcohol may be used to line the mold, and the reactant mixture will not adhere to such a bag. The penetration or partial penetration of the skin materials 14 by the reactant alkyd resin-polyisocyanate mixture 15 results in a particularly effective lamination or bonding of the several layers of the skins 14 and a strong uniform and continuous bonding or merger of the skins 14 with the cellular core 16. The material 15 that enters the skins 14 and that occupies the zones at the inner faces of the skins 14 reacts in the same manner as the material 15 in the main mass or body of the core 16 to produce a cellular high-strength, low-density plastic characterized by the small cells of substantially uniform size and shape. The cellular plastic coats, embeds and bonds with the fibers, strands, layers, and threads of the skin material so that the skins 14 are, in effect, cast or embedded in the self-same material constituting the core 16 resulting in a product or structure of great strength, uniform composition and substantially uniform physical characteristics and of uniform transparency to radar or micro-wave energy. Upon completion of the initial reaction of the core 16 the product or housing may be post-cured in the mold assembly at a temperature of from 125° F. to 225° F. for up to 24 hours.

The products or devices produced as above described each comprise a continuous one-piece core 15 of foamed or cellular low-density plastic and internal and external skins 14 of fibre-glass fabric, felt, or the like, laminated and impregnated with resin or plastic. The sandwich-type construction is extremely strong and yet has a very low-density owing to the low-density cellular plastic core 15. The products may be produced to have good dielectric characteristics and to pass or conduct micro-wave energy with but slight loss. The products may be cut or machined as found necessary and it is usually preferred to trim off the rough or uneven upper or open ends of the products or housings to bring them to the desired size and configuration.

Instead of employing prelaminated and preformed skins 14 or dry, unformed skins 14, in the manufacture of the devices provided by this invention, the skins 14 may be one or more layers, sheets or plies of fibre-glass fabric, fibre-glass matting, felt, or the like, or combinations of such materials initially in the dry-soft condition and then wet or saturated or partially saturated with what we will term a laminating resin prior to or at the time they are arranged on the surfaces of the mold 10-12. The alkyd resin-diisocyanate reactant mixture 15 is allowed or caused to react in the mold space defined by the wet skin materials so that the foaming alkyd resin-diisocyanate reaction product copolymerizes with the laminating resin to produce or provide diffusion zones of cured or hardened resins in the product. These diffusion zones which are coextensive with the marginal portions of the core 16 as well as with some or all of the laminated or single-ply skins 14 are areas whose compositions graduate or change gradually from substantially pure laminating resin to substantially pure alkyd resin-diisocyanate reaction products of the core. One of these diffusion interfacial zones is illustrated diagrammatically in Figure 5 on a greatly enlarged scale and has been fully described above.

We have found that articles such as housings, radomes, etc. of uniform micro-wave energy transmission characteristics and having excellent resistance to gun blasts, vibration, shock and changes in temperature and atmospheric pressure, are obtained when the skins or skin materials are provided with a laminating resin in such a manner that the skins remain porous. These skins, which are designated in Figures 7, 8 and 9 by the general reference numeral 50, are preferably constructed of one or more plies, layers, or laminations of fibre-glass cloth, or the like, although other fibrous materials may be employed, if desired. In Figures 6 to 9 inclusive, we have illustrated on a greatly enlarged scale, a single layer or ply of fibre-glass cloth 51 and will describe the manner of providing the cloth with the laminating resin 52, it being understood that these drawings are more or less diagrammatic and that in practice each skin may comprise two or more such plies or layers. It will be observed in Figure 7 that the resin 52 coats or covers the individual threads, fibres, or strands of the cloth 51 and yet does not fill or close the openings or pores of the cloth, there being clear, unoccupied spaces or pores 53 between or defined by the resin coated fibres or threads. This structure is obtained by saturating the cloth 51 with a solution of a non-volatile resin and a volatile solvent. The non-volatile resin may be a monomer, a polymer dissolved in the non-volatile monomer or more than one copolymerizable laminating resins each capable of cross-linking through addition polymerization in the presence of a peroxide type catalyst to form a thermosetting type resin. Such non-volatile laminating resins, capable of cross-linking to form thermosetting polymers, which we have found to be practical for the purpose are:

1. Diallyl phthalate

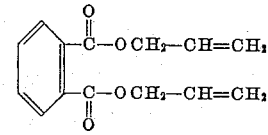

2. Diallyl phthalate pre-polymer (a solution of low molecular weight polymer in monomer).
3. Diallyl phenyl phosphonate

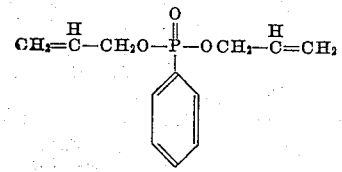

4. Diallyl phenyl phosphonate pre-polymer (bodied diallyl phenyl phosphonate).

5. Glycol diacrylate

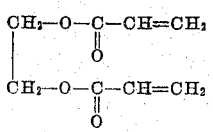

6. Bodied glycol diacrylate.
7. Allyl diglycol carbonate

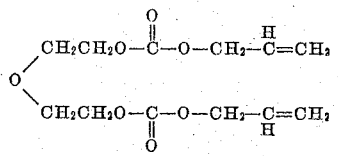

8. Bodied allyl diglycol carbonate.
9. Diallyl maleate and bodied diallyl maleate

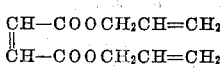

10. Diallyl fumarate and bodied diallyl fumarate

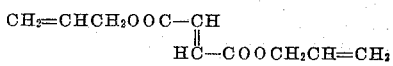

11. Diethylene glycol maleate

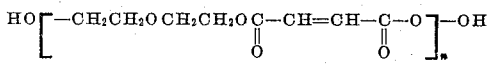

12. Diethylene glycol maleate+diallyl phthalate.
13. Diethylene glycol maleate+diallyl phenyl phosphonate.

The volatile solvents for the above non-volatile laminating resins which may be used individually or in mixtures are:

Methyl ethyl ketone
Ethyl acetate
Trichlorethylene
Benzene.

The resin coating or loading of the cloth 51 to provide it with the resin covering 52 which leaves or defines the pores 53 is produced by dissolving one or more of the non-volatile laminating resins in the selected volatile solvent, or a mixture of such solvents, then applying the resin solution to the cloth and then allowing or causing the solvent to evaporate to deposit or leave the resin coatings or films 52 on the threads or fibres 51 of the cloth. The resin is dissolved in the solvent to obtain a solution of from 25 to 75% and preferably about 50% by weight of the resin. The skin or cloth 51 to be treated is then weighed, it being preferred to weigh each ply or sheet separately. The weight of the ply or sheet is then taken into account to determine the amount of the resin-solvent solution that will be required to give the sheet a preferred 20 to 25% by weight loading of the resin although a loading of from 15 to 30% by weight may be used if desired. The cloth plies 51 of a given skin lamination are then saturated with the amount of the resin-solvent solution thus determined. This may be done in any practical manner as by painting, dipping, with rollers or the like. The solvent is then allowed to evaporate to leave the resin 52 deposited on the fibres or threads 51 of the cloth. A mild heat of below 150° F. may be used to hasten the solvent release. The plies thus treated are then laid up in the mold 10-12, that is it is arranged on the walls or surfaces of the mold as above described and cured at approximately 200° F., using a vacuum bag as a source of pressure, to produce a preformed cured or rigid porous skin.

The above described manner of treating the sheets or plies 51 results in porous laminations 50 that are penetrated by the alkyd resin-polyisocyanate-reactant core forming mixture, or other of the above described reactant core mixtures, when the latter reacts in the mold space or cavity. As illustrated diagrammatically in Figures 8 and 9, the cellular adherent core material 15 fills the pores 53 of the skin 50 moving into the pores under the pressure developed during its foaming reaction to completely occupy all voids in the skin. The material 15 thus directly contacts and adheres to the laminating resin 52 on the fibers or threads of the cloth and obtains a secure mechanical locking contact or engagement with the resin coated fibers or threads. When the fibrous skins 50 are used it may be desired or necessary to apply a parting compound or material such as above described to the surfaces of the mold 10-12 before laying the skins in the mold. The resin impregnated skins 50 are much easier to handle than the untreated dry skins. We have found that excellent high strength products are obtained when the resin impregnated skins are laid up in the mold in the dried or set and preformed condition or when laid up in the mold in the wet state. The cured rigid and preformed porous skins 14 produced, as just described, may be wet or provided with a laminating resin such as above described, and the core forming material 15 caused to react between the spaced skins while the resin on the skin remains wet. In the latter case there is a copolymerization between the laminating resin on the preformed skins and the foaming core material 15 to produce a chemical union and a graduated or blended structure such as illustrated in Figure 5. In either case the resultant product or article is highly resistant to the effects of gun blasts and the skins and core are less likely to separate under the influence of vibration, shock, temperature changes and pressure variations and are very uniform in the transmission of radar energy, etc.

Having described only typical forms of the invention we do not wish to be limited to the specific details herein set forth, but wish to reserve to ourselves any variations or modifications that may appear to those skilled in the art and fall within the scope of the following claims.

We claim:

1. An article of manufacture comprising spaced skin laminations of fibrous materials, laminating plastic impregnated in said materials, and a core layer of cellular plastic material cast between said skin laminations, there being interfacial zones at the planes of joinder of the core layer and skin laminations containing said laminating plastic, said plastic material of the core layer, and a copolymer of the same.

2. An article of manufacture comprising spaced apart skin laminations of fibrous material, plastic impregnated in the skin laminations of the class adapted to copolymerize with isocyanate-containing molecules, and a core layer of cellular alkyd resin-diisocyanate-ethyl cellulose plastic cast between the skin laminations so as to bond therewith, there being interfacial zones at the areas of joinder of the core layer and skin laminations containing said plastic of the skin laminations, the plastic of the core layer, and a copolymer of the same.

3. An article of manufacture comprising spaced apart skin laminations of fibre-glass fabric, plastic impregnated in the skin laminations of the class adapted to copolymerize with isocyanate-containing molecules, and a core layer of cellular alkyd resin-diisocyanate-ethyl cellulose plastic cast between the skin laminations so as to bond therewith, there being interfacial zones at the areas of joinder of the core layer and skin laminations containing said plastic of the skin laminations, the plastic of the core layer, and a copolymer of the same.

4. In an article of manufacture the combination of; a porous fibrous skin, resin on the skin in the amount of from 15 to 30% by weight of the skin which is an amount insufficient to clog the pores of the skin, and a lamination of cellular plastic bonded with the resin of the skin and occupying the pores of the skin to be mechanically secured thereto.

5. In an article of manufacture the combination of; a porous fibrous skin, laminating resin in the skin in the amount of from 15 to 30% by weight of the skin which is an amount insufficient to clog the pores of the skin, and a lamination of cellular alkyd resin-polyisocyanate plastic bonded with the resin of the skin and occupying the pores of the skin to be mechanically secured thereto.

6. In an article of manufacture the combination of; a porous fibrous skin, laminating resin in the skin in the amount of from 15 to 30% by weight of the skin which is an amount insufficient to clog the pores of the skin, and a lamination of cellular plastic, the plastic of the lamination being chemically united with said resin and occupying said pores to be bonded both chemically and mechanically with said skin.

7. In an article of manufacture the combination of; a porous fabric skin, a non-volatile unsaturated resin deposited on said skin in an amount insufficient to close the pores of the skin, and a lamination of a cellular low-density alkyd resin-meta-toluene diisocyanate plastic, the plastic of the laminations being chemically united with said resin on the skin and entering the pores of the skin.

8. An article of manufacture comprising spaced apart skins of porous fabric, resin on the fabric of the skins, said resin leaving the pores of the fabric open, and a lamination of cellular alkyd resin-diisocyanate-ethyl cellulose plastic cast between the skins to bond with said resin and to occupy the pores in the fabric of the skin.

9. In an article of manufacture the combination of; a skin including a porous fabric, first resin on the fabric in an amount insufficient to close the pores thereof and cured to render the skin substantially rigid, and a second resin on the fabric of the class adapted to copolymerize with isocyanate-containing molecules and a lamination of cellular alkyd resin-diisocyanate plastic cast against the skin so as to mechanically bond therewith and blend with said second resin to form an interfacial zone containing said second resin and said alkyd resin-diisocyanate.

10. An article of manufacture comprising spaced apart skins of porous fabric, cured resin on the fabric to render the same substantially rigid and in an insufficient amount to close the pores of the skin, a second resin on the fabric skins, and a core layer of cellular alkyd resin-diisocyanate plastic copolymerized with said second resin and entering the pores of the skins.

11. In an article of manufacture the combination of; a skin including a porous fabric, first resin on the fabric in an amount insufficient to close the pores thereof and cured to render the skin substantially rigid, and a second resin on the fabric of the class adapted to copolymerize with isocyanate-containing molecules, and a lamination of cellular alkyd resin-diisocyanate plastic blended with said second resin and occupying the pores of the fabric to have a chemical union and a mechanical lock with the skin.

12. An article of manufacture comprising a preformed skin including a porous fabric and a cured resin on the fabric in insufficient quantity to close the pores of the fabric, a layer of cellular alkyd resin-diisocyanate plastic, and an interfacial zone containing molecules of said plastic and of a second resin and occupying the pores of the skin.

ELI SIMON.
FRANK W. THOMAS.
EDWARD H. BURKART.

References Cited in the file of this patent

UNITED STATES PATENTS

| Number | Name | Date |
|---|---|---|
| 2,376,653 | Boyer | May 22, 1945 |
| 2,377,846 | Dreyfus et al. | June 5, 1945 |
| 2,414,125 | Rheinfrank | Jan. 14, 1947 |

OTHER REFERENCES

Monsanto Technical Bulletin No. P-145, March 16, 1950 (13 pages).